(12) United States Patent
Kurz (10) Patent No.: US 12,452,537 B2
(45) Date of Patent: Oct. 21, 2025

(54) AUTOMATIC CAMERA CONFIGURATION SYSTEMS AND METHODS

(71) Applicant: Westinghouse Air Brake Technologies Corporation, Pittsburgh, PA (US)

(72) Inventor: Brian Kurz, Germantown, MD (US)

(73) Assignee: Westinghouse Air Brake Technologies Corporation, Pittsburgh, PA (US)

(*) Notice: Subject to any disclaimer, the term of this patent is extended or adjusted under 35 U.S.C. 154(b) by 381 days.

(21) Appl. No.: 17/532,522

(22) Filed: Nov. 22, 2021

(65) Prior Publication Data

US 2022/0182552 A1    Jun. 9, 2022

Related U.S. Application Data

(60) Provisional application No. 63/122,701, filed on Dec. 8, 2020.

(51) Int. Cl.
*H04N 23/695* (2023.01)
*H04N 23/661* (2023.01)
*H04N 23/698* (2023.01)

(52) U.S. Cl.
CPC ......... *H04N 23/695* (2023.01); *H04N 23/661* (2023.01); *H04N 23/698* (2023.01)

(58) Field of Classification Search
CPC .. H04N 23/695; H04N 23/661; H04N 23/698; H04N 17/002; H04N 23/60; H04N 23/64; H04N 5/77; H04N 7/183; H04N 23/667; G07C 5/0866; G07C 5/085; G06N 3/04; G06N 3/08; G06N 20/00
See application file for complete search history.

(56) References Cited

U.S. PATENT DOCUMENTS

| | | | |
|---|---|---|---|
| 9,460,566 B2 | 10/2016 | Allwardt | |
| 10,140,790 B2 | 11/2018 | Allwardt | |
| 10,198,882 B2 | 2/2019 | Allwardt | |
| 11,030,834 B2 | 6/2021 | Allwardt | |
| 2014/0267724 A1* | 9/2014 | Goergen | ................ H04N 5/772 348/148 |

(Continued)

FOREIGN PATENT DOCUMENTS

| | | |
|---|---|---|
| CN | 110997488 | 4/2020 |
| EP | 3073449 A1 | 9/2016 |
| WO | 2019022910 | 1/2019 |

OTHER PUBLICATIONS

"Liang Wang et. al., Detect the Rail Track Flaw by Estimating the Camera Shaking, Oct. 2014, 17th International IEEE Conference on Intelligent Transportation Systems, IEEE, Qingdao, China" (Year: 2014).*

(Continued)

*Primary Examiner* — Michael Horabik
*Assistant Examiner* — Phuong Hau Cai
(74) *Attorney, Agent, or Firm* — K&L Gates LLP (57) ABSTRACT

A system includes a camera and at least one processor. The camera has a field of view, and is configured to acquire imaging information within the field of view. The at least one processor is operably coupled to the camera and configured to acquire the imaging information from the camera. The at least one processor is configured to autonomously set vehicle configuration parameters for use of the camera with a vehicle based on the imaging information within the field of view.

20 Claims, 3 Drawing Sheets

(56) References Cited

U.S. PATENT DOCUMENTS

2017/0309042 A1    10/2017    Tanaka et al.
2020/0079387 A1    3/2020    A G et al.
2020/0238906 A1    7/2020    Yoshizaki et al.

OTHER PUBLICATIONS

"Chil Jin Cho et. al., Video-Based Dynamic Stagger Measurement of Railway Overhead Power Lines Using Rotation-Invariant Feature Matching, Jun. 2015, IEEE Transactions on Intelligent Transportation Systems, vol. 16, No. 3" (Year: 2015).*
"Stephen Reinach et. al., Application of a Human Error Framework to Conduct Train Accident/Incident Investigations, Oct. 2005, Accident Analysis and Prevention 38 [2006], 396-406" (Year: 2005).*
"Paul Hyde et. al., Development and Testing of an Automatic Remote Condition Monitoring System for Train Wheels, Nov. 2015, IET Intelligent Transport Systems, RRUKA Conference Special Issue" (Year: 2015).*
"VMix, How to update vMix to the latest version, Jun. 2018, vMix, Knowledge Base" (Year: 2018).*
"NPG31, Automated Camera Switching, 2015, VMix Live Production Forums, https: https://forums.vmix.com/posts/t3566-Automated-Camera-Switching" (Year: 2015).*
"Speegs , (n Vehicle Cameras—Live Streaming Ractracks, 2017, https: https://forums.vmix.com/posts/t8406-In-Vehicle-Cameras---Live-Streaming-Racetracks" (Year: 2017).*
"M. Sai Mounica et. al., Low Cost Eye Gaze Tracker Using Web Camera, 2019, Proceedings of the Third International Conference on Computing Methodologies and Communication" (Year: 2019).*
"Vsevolod Peysakhovich et. al., The Neuroergonomics of Aircraft Cockpits: The Four Stages of Eye-Tracking Integration to Enhance Flight Safety, Feb. 2018, Safety 2018, 4[1], 8" (Year: 2018).*
"Eric Foxlin et. al., FlightTracker: A Novel Optical/Inertial Tracker for Cockpit Enhanced Vision, Nov. 2004, Third IEEE and ACM International Symposium on Mixed and Augmented Reality" (Year: 2004).*
Extended European Search Report mailed Apr. 20, 2022 for corresponding European Patent Application No. 21211020.9 (11 pages).
Office action for Chinese Application No. 202111491571.6 dated Nov. 3, 2022 (and English translation).
Examination Report for Australian Application No. 2021277699,I dated Mar. 23, 2023.
Office Action based on CN20111491571.6 application, dated May 19, 2023.

\* cited by examiner

AUTOMATIC CAMERA CONFIGURATION SYSTEMS AND METHODS

CROSS-REFERENCE TO RELATED APPLICATIONS

This application claims priority to U.S. Provisional Application Ser. No. 63/122,701, entitled "Automatic Camera Configuration Systems and Methods" (filed Dec. 8, 2020) the entire disclosure of which is incorporated by reference.

BACKGROUND

Technical Field

The subject matter described relates to systems and methods for use in conjunction with configuring cameras, for example in connection with use of one or more cameras for operation and/or analysis of a vehicle.

Discussion of Art

Cameras may be used in connection with the operation of vehicles, with various aspects of the camera configured based on its intended use. Conventional approaches rely on installers to manually determine or select configuration parameters. Manual configuration can be costly, time-consuming, and/or prone to error.

BRIEF DESCRIPTION

In accordance with one example or aspect, a system may include a camera and at least one processor. The camera has a field of view, and may acquire imaging information within the field of view. The at least one processor may be operably coupled to the camera and may acquire the imaging information from the camera. The at least one processor may autonomously set vehicle configuration parameters for use of the camera with a vehicle based on the imaging information within the field of view.

In accordance with one example or aspect, a method may include positioning a camera having a field of view in an installation location. The camera may acquire imaging information within the field of view. The method may also include acquiring, with at least one processor operably coupled to the camera, the imaging information from the camera. Further, the method may include autonomously setting, with the at least one processor, vehicle configuration parameters for use of the camera with a vehicle based on the imaging information within the field of view.

In accordance with one example or aspect, a system may include a vehicle, a camera, and at least one processor. The camera may be disposed on the vehicle. The camera has a field of view, and may acquire imaging information within the field of view. The at least one processor may be operably coupled to the camera and may acquire the imaging information from the camera. The at least one processor may autonomously set vehicle configuration parameters for use of the camera with the vehicle based on the imaging information within the field of view.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to systems and methods for configuring cameras for use with vehicles. Various embodiments utilize video analytics to automatically determine the location and/or orientation of a camera based on imaging information obtained with the camera. Accordingly, various configuration aspects may be determined without human interaction after a camera is connected to a system. Examples of items that may be configured and/or verified include camera location, camera mounting position, and camera orientation.

Various embodiments provide efficient and accurate configuring of cameras for use with vehicles.

While various examples herein may be discussed in connection with rail vehicles, it may be noted that not all embodiments described herein are limited to rail vehicle systems. Unless expressly disclaimed or stated otherwise, the inventive subject matter described herein extends to other types of vehicle systems, such as automobiles, trucks (with or without trailers), buses, marine vessels, aircraft, mining vehicles, agricultural vehicles, or other off-highway vehicles. The vehicle systems described herein (rail vehicle systems or other vehicle systems that do not travel on rails or tracks) can be formed from a single vehicle or multiple vehicles. With respect to multi-vehicle systems, the vehicles can be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy).

Figure 1:
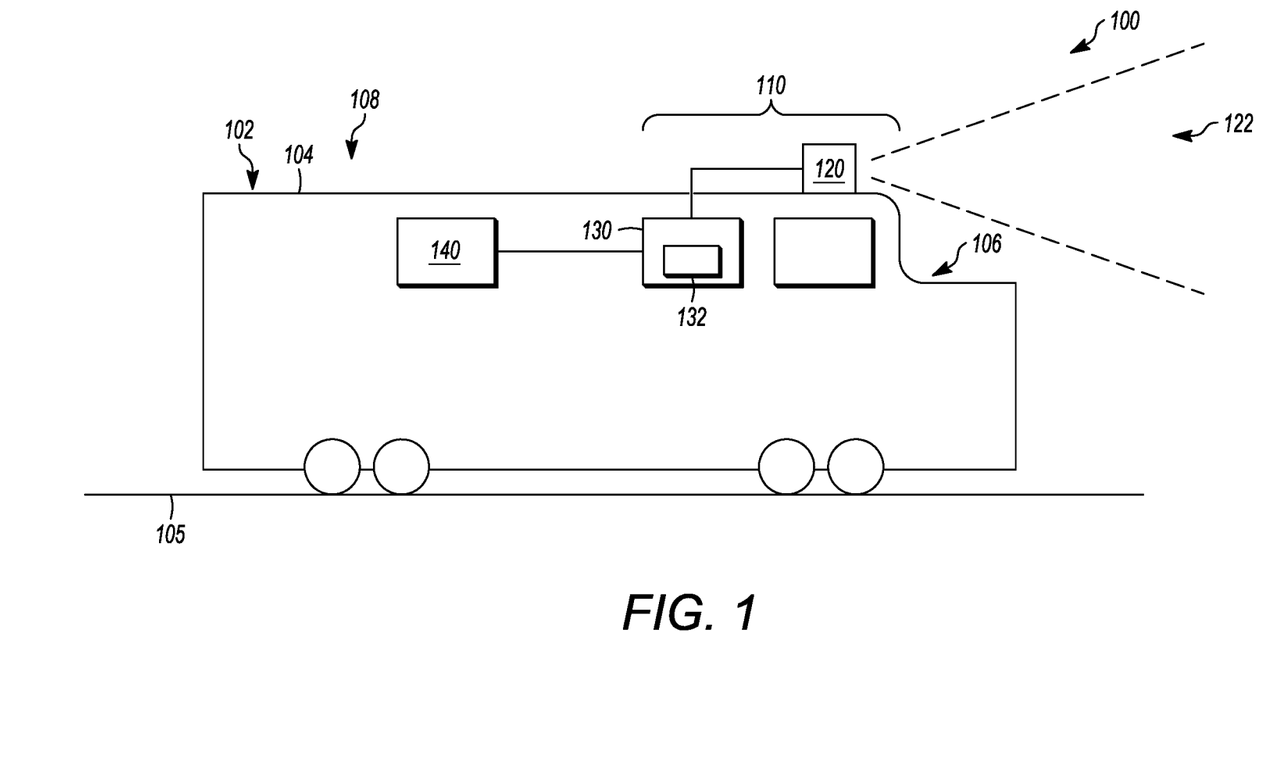
FIG. 1 illustrates a block schematic diagram of a system.

FIG. 1 illustrates a schematic diagram of a system 100. The system includes a vehicle 102 and a camera system 110. The camera system in turn includes a camera 120 and a processing unit 130. It may be noted that while only one vehicle, camera, and processing unit are shown in the depicted example for ease of illustration, additional vehicles, cameras, and/or processing units may be used in various embodiments.

The vehicle, for example, may be a rail vehicle such as a locomotive. In the illustrated embodiment, the vehicle is a locomotive 104 disposed on a route 105 and having a short hood 106, (or forward oriented portion), and a long hood 108 (or rearward oriented portion).

The depicted camera is disposed on the vehicle, and has a field of view 122. The camera may acquire imaging information within the field of view. In the illustrated example, the camera is mounted on the vehicle toward the front of the vehicle near the short hood, and oriented toward a location in front of the vehicle. In the depicted example, the camera is illustrated positioned on the exterior of the vehicle; however, in practice, to obtain an exterior view, the camera may alternatively be positioned inside the vehicle and oriented toward an exterior view through a window. Additional or alternative locations and/or orientations may be utilized. For example, the camera may be mounted on the long hood and/or oriented toward a view behind the vehicle, or as another example, may provide a view to the side of the vehicle. As another example, the camera may be positioned on an inner surface (e.g., wall, floor, ceiling) or other inner portion of the vehicle, with the camera oriented toward a desired position within the vehicle (e.g., toward an engineer or operator, toward a group of passenger seats, or the like).

The processing unit is coupled to the camera, and may acquire the imaging information from the camera. The processing unit may autonomously set vehicle configuration parameters for use of the camera with the vehicle based on the imaging information within the field of view. The processing unit may be communicatively coupled with one or more additional systems of the vehicle, so that, once determined and/or set, the vehicle configuration parameters of the camera may be provided to one or more systems of the vehicle for use with the vehicle (e.g., during operation of the vehicle, or as part of an analysis of vehicle performance). The depicted example vehicle includes an event recorder 140. The processing unit is communicatively coupled to the event recorder, and provides imaging information acquired via the camera to the event recorder. Accordingly, the vehicle configuration parameters of the camera may be used in connection with the event recorder used to analyze accidents or other events. It may be noted that the vehicle configuration parameters for the camera may be determined or set at a time of installation and/or updated or adjusted at various times (e.g., as part of periodic maintenance, or responsive to a change in conditions).

In various embodiments, the processing unit may determine and set one or more vehicle configuration parameters using a predetermined model or other analytic technique based on imaging information within the field of view. In various embodiments, the predetermined model may utilize a neural network to train the model to recognize structures, patterns, or other aspects of imaging information corresponding to particular desired configuration parameters. For example, a trained model or other video analytic techniques may be used to compare identified objects or aspects within imaging information acquired from the field of view of the camera with expected results for one or more views corresponding to known locations and orientations associated with the vehicle. If the imaging information acquired from the field of view matches or corresponds to the objects or aspects expected for a given, known location and orientation, the processing unit then sets one or more vehicle configuration parameters to correspond to predetermined parameters for that location and orientation, and/or based on predetermined requirements for that location and orientation.

The vehicle configuration parameters, for example, may depict, describe, correspond to, or otherwise relate to aspects of the vehicle, or as another example, to performance or settings of the camera. In various embodiments, vehicle configuration parameters of the camera may provide information about the camera and/or the imaging information acquired by the camera. For example, the vehicle configuration parameters autonomously set by the processing unit in various embodiments include one or more of frame rate setting, resolution setting, quality setting, or compression setting. As one example, a desired frame rate setting and resolution setting may be known a priori for a given location and orientation for the camera. Once the processing unit determines that the camera is in that particular location and orientation, the processing unit may set the frame rate setting and resolution setting accordingly. Additionally or alternatively, such settings may be set and/or adjusted based on imaging information from the camera (e.g., an amount of light available in the field of view, or an amount of motion within the field of view).

As indicated above, vehicle configuration parameters of the camera may provide information about the camera with respect to the vehicle that may be used in connection with operation of the vehicle. For example, the vehicle configuration parameters that are autonomously set by the at least one processor in various embodiments include one or more of a camera location, mounting position, or orientation. As one example, the vehicle configuration parameters may specify a location of the camera on or near the short hood, mounted at a particular, predefined location on an upper surface of the vehicle, and an orientation in front of the vehicle. Then, if an event that occurred in front of the vehicle is to be analyzed, an event recorder system may identify, using the vehicle configuration parameters of the camera, the camera as a camera that will have potentially useful information, acquire imaging information (e.g., stored imaging information from the camera corresponding to a pertinent time frame of the event), and use the imaging information to analyze the event. Other example locations specified by vehicle configuration parameters in various embodiments include inside of the vehicle, with example mounting positions including a ceiling or a wall. 360 degree or "fisheye" cameras may be used in various embodiments, for example for cameras that are directed toward an interior of the vehicle.

In various embodiments, the processing unit may also determine whether the camera is in compliance with a target specification by comparing the imaging information acquired with the camera to predetermined target criteria. For example, for a forward facing camera disposed inside a vehicle that is to be used to obtain a view external to the vehicle, it may be determined if the camera is properly oriented out of a window to have the desired field of view. As another example, for an inward facing camera, it may be determined if the field of view adequately captures the engineer and/or conductor positions.

Figure 2:
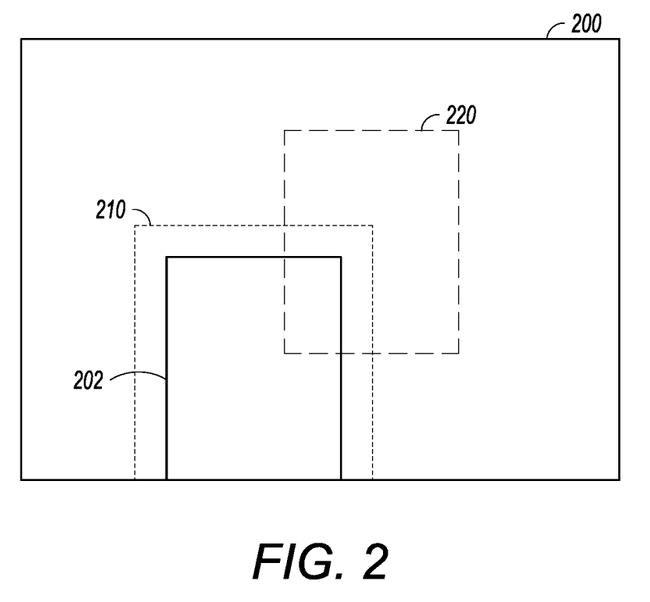
FIG. 2 provides an example view of a display of an acquired image.

FIG. 2 provides an example display. The example display of the illustrated embodiment corresponds to a camera desired to have a target field of view 210 (shown by double-dashed lines) that include a seat 202 (e.g., a seat for a conductor). However, the actual field of view 220 provided by the camera, as determined by the imaging information provided by the camera, is represented by dashed lines, and is offset from the target field of view. In various embodiments, the processing unit may determine that the desired target specification (e.g., target field of view) is not satisfied. For example, the processing unit may identify the seat in each field of view, and determine that the seat is not in the same relative position in each field of view, and accordingly that the actual field of view is offset from the target field of view.

In various embodiments, the processing unit may perform a responsive act responsive to determining that the camera is not in compliance with the target specification. In some embodiments, the processing unit performs a responsive act by providing instructions to an operator to bring the camera into compliance with the target specification. For example, in connection with the example of FIG. 2, the processing unit may determine how much, and in what direction, the actual field of view is offset or misaligned from the target field of view, and provide instructions to an operator to adjust the orientation of the camera to address the offset or misalignment. After the operator makes the adjustment, the processing unit may analyze the resulting field of view from the newly adjusted camera, and either confirm that the orientation now matches the target specification (e.g., matches within a target or predetermined tolerance metric), or, if it does not match, provide additional instructions for further adjustment to bring the field of view into compliance.

Alternatively or additionally, responsive acts may include providing an alert to an operator and/or other personnel, or, as another example, changing a setting (e.g., frame rate setting) of the camera.

With continued reference to FIG. 1, it may be noted that the processing unit (or aspects thereof) may be disposed in a separate unit, incorporated into a system of the vehicle, and/or incorporated into the camera itself in various embodiments. For example, the processing unit is depicted as a single stand-alone unit in FIG. 1. However, the processing unit (or aspects thereof) may in various embodiments be disposed on the event recorder (or other system of the vehicle).

The depicted processing unit includes a memory 132. The processing unit is depicted as including a single processing unit; however, the block for the processing unit may be understood as representing one or more processors that may, in some embodiments, be distributed or remote from each other. The processing unit in various embodiments includes processing circuitry that performs one or more tasks, functions, or steps discussed herein (e.g., method 300 or aspects thereof). It may be noted that "processing unit" as used herein is not intended to necessarily be limited to a single processor or computer. For example, the processing unit may include multiple processors and/or computers, which may be integrated in a common housing or unit, or which may distributed among various units or housings.

Generally, various aspects (e.g., programmed modules) of the processing unit act individually or cooperatively with other aspects to perform one or more aspects of the methods, steps, or processes discussed herein (e.g., method 300, or aspects thereof). In the depicted embodiment, the memory includes a tangible, non-transitory computer readable medium having stored thereon instructions for performing one or more aspects of the methods, steps, or processes discussed herein.

Figure 3:
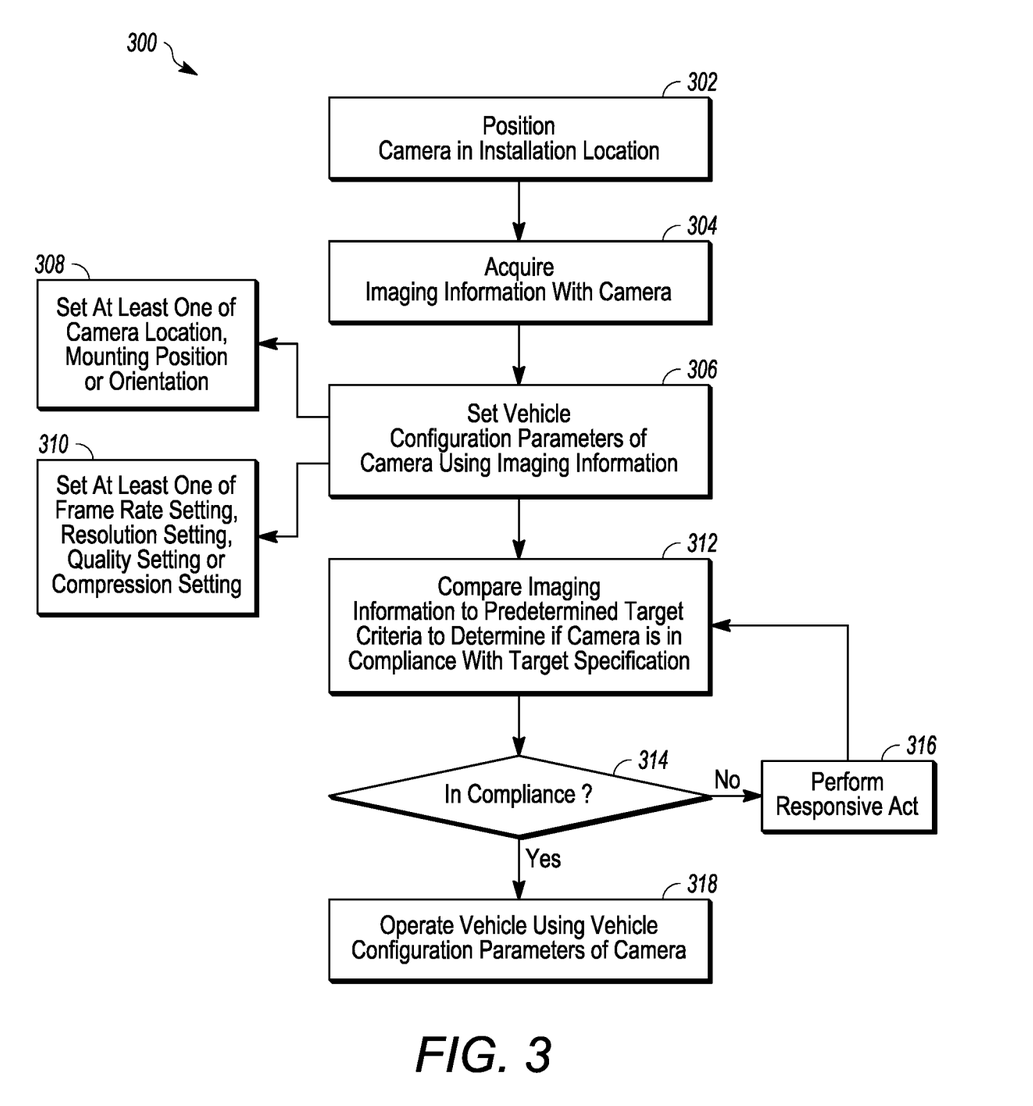
FIG. 3 illustrates a flowchart of a method.

FIG. 3 illustrates a flowchart of a method 300. The operations of FIG. 3 may be implemented by one or more processors (e.g., processing unit) executing program instructions stored in memory. The method 300, for example, may employ structures or aspects of various embodiments (e.g., systems and/or methods) discussed herein, such as the system and/or camera system. In various embodiments, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method may be used as one or more algorithms to direct hardware to perform one or more operations described herein. It should be noted, other methods may be used, in accordance with embodiments herein.

At step 302, a camera (e.g., camera as depicted and discussed in connection with FIG. 1) is positioned in an installation location. For example, the installation location may be on a vehicle (e.g., inside of the vehicle). The camera has a field of view and may acquire imaging information within the field of view. The camera in various embodiments is positioned at a predetermined installation location on a vehicle (e.g., mounted to an exterior surface of a vehicle or an interior surface of the vehicle) having a predetermined target orientation to provide imaging information for use in connection with operating a vehicle and/or analyzing operation of a vehicle. The camera in various embodiments is positioned as part of an original installation. Additionally or alternatively, the position of an already-installed camera may be adjusted or changed as part of a maintenance procedure.

At step 304, imaging information is acquired from the camera. For example, the imaging information may be acquired by or provided to at least one processor that is coupled to the camera (e.g., processing unit as depicted and discussed in connection with FIG. 1). The imaging information may include a single image or a series of images.

At step 306, vehicle configuration parameters of the camera are set based on the imaging information within the field of view. The vehicle configuration parameters are for use of the camera with a vehicle. The vehicle configuration parameters in various embodiments are autonomously set by at least one processor (e.g., processing unit as depicted and discussed in connection with FIG. 1). Different types of vehicle configuration parameters of the camera may be used in various embodiments.

For example, in the illustrated embodiment, at step 308, setting the vehicle configuration parameters includes autonomously setting at least one of a camera location, mounting position, or orientation. In various embodiments, as also discussed above, imaging information acquired with the camera is analyzed to determine or identify a corresponding known camera location, mounting position, and/or orientation (e.g., a known location, mounting position, and/or orientation that is associated with imaging information that matches the imaging information acquired by a given camera), with the determined corresponding known camera location set as a configuration parameter for the given camera. Different vehicle configuration parameters may be set alternatively or additionally. For example, in the illustrated embodiment, at step 310, setting the vehicle configuration parameters includes autonomously setting at least one of frame rate setting, resolution setting, quality setting, or compression setting.

At step 312, it is autonomously determined if the camera is in compliance with a target specification. In the illustrated embodiment, the imaging information acquired with the camera is compared to predetermined target criteria. If, at step 314, it is determined that the target is not in compliance, the method proceeds to step 316, and a responsive act is performed. The responsive act may include, for example, providing instructions to an operator to bring the camera into compliance with the target specification. After the responsive act is performed, the method returns to step 312 for determination if the camera is in compliance with the target specification.

If the camera is in compliance with the target specification, the method proceeds to step 318 and the vehicle is operated using the vehicle configuration parameters of the camera. It may be noted that various steps of the method may be performed in additional or different orders, or iteratively. For example, compliance with a first aspect of a target specification may be confirmed before compliance with a second aspect of a target specification is confirmed, and/or a second parameter may be set or determined after compliance with a first parameter is confirmed.

In accordance with one example or aspect, a system may include a camera and at least one processor. The camera has a field of view, and may acquire imaging information within the field of view. The at least one processor may be operably coupled to the camera and may acquire the imaging information from the camera. The at least one processor may autonomously set vehicle configuration parameters for use of the camera with a vehicle based on the imaging information within the field of view.

Optionally, the vehicle configuration parameters that are autonomously set by the at least one processor include at least one of a camera location, mounting position, or orientation.

Optionally, the vehicle configuration parameters autonomously set by the at least one processor include at least one of a frame rate setting, resolution setting, quality setting, or compression setting.

Optionally, the at least one processor may determine whether the camera is in compliance with a target specification by comparing the imaging information acquired with the camera to predetermined target criteria. For example, the at least one processor may perform a responsive act responsive to determining that the camera is not in compliance with the target specification. Optionally, performing the responsive act may include providing instructions to an operator to bring the camera into compliance with the target specification. For example, the instructions may include an instruction to the operator to adjust an orientation of the camera.

Optionally, the at least one processor may be disposed on an event recorder of the vehicle with which the camera is configured to be used.

In accordance with one example or aspect, a method may include positioning a camera having a field of view in an installation location. The camera may acquire imaging information within the field of view. The method may also include acquiring, with at least one processor operably coupled to the camera, the imaging information from the camera. Further, the method may include autonomously setting, with the at least one processor, vehicle configuration parameters for use of the camera with a vehicle based on the imaging information within the field of view.

Optionally, the step of autonomously setting the vehicle configuration parameters may include autonomously setting at least one of a camera location, mounting position, or orientation.

Optionally, the step of autonomously setting the vehicle configuration parameters may include autonomously setting at least one of a frame rate setting, resolution setting, quality setting, or compression setting.

Optionally, the method may also include a step autonomously determining, with the at least one processor, whether the camera is in compliance with a target specification by comparing the imaging information acquired with the camera to predetermined target criteria. Further, the method may include a step of performing a responsive act responsive to determining that the camera is not in compliance with the target specification. For example, the step of performing the responsive act may include providing instructions to an operator to bring the camera into compliance with the target specification.

In accordance with one example or aspect, a system may include a vehicle, a camera, and at least one processor. The camera may be disposed on the vehicle. The camera has a field of view, and may acquire imaging information within the field of view. The at least one processor may be operably coupled to the camera and may acquire the imaging information from the camera. The at least one processor may autonomously set vehicle configuration parameters for use of the camera with the vehicle based on the imaging information within the field of view.

Optionally, the vehicle configuration parameters that are autonomously set by the at least one processor include at least one of a camera location, mounting position, or orientation.

Optionally, the vehicle configuration parameters that are autonomously set by the at least one processor include at least one of a frame rate setting, resolution setting, quality setting, or compression setting.

Optionally, the at least one processor may determine whether the camera is in compliance with a target specification by comparing the imaging information acquired with the camera to predetermined target criteria. Further, the at least one processor may perform a responsive act responsive to determining that the camera is not in compliance with the target specification.

Optionally, the vehicle includes an event recorder, and the at least one processor is disposed on the event recorder.

As used herein, the terms "processor" and "computer," and related terms, e.g., "processing device," "processing unit," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

In one embodiment, the processing unit may have a local data collection system deployed that may use machine learning to enable derivation-based learning outcomes. The processing unit may learn from and make decisions on a set of data (including data provided by various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, with some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the processing unit may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using back-propagation, the machine learning system may use evolution strategies or techniques to tune various parameters of the neural network. The processing unit may use neural network architectures with functions that may not always be solvable using back-propagation, for example functions that are non-convex. In one embodiment, the neural network has a set of parameters representing weights of its node connections. A number of copies of this network are generated an then different adjustments to the parameters are made, and simulations are done. Once the output from the various models are obtained, the may be evaluated on their performance using a determined success metric. That model is selected, and the processing unit executes that plan. Additionally, the success metric may be a combination of the optimized outcomes, which may be weighted relative to each other.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following clauses, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein define the parameters of the inventive subject matter, they are exemplary embodiments. Other embodiments will be apparent to one of ordinary skill in the art upon reviewing the above description. The scope of the inventive subject matter should, therefore, be determined with reference to the appended claims, along with the full scope of equivalents to which such clauses are entitled.

This written description uses examples to disclose several embodiments of the inventive subject matter, including the best mode, and to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:
1. A system comprising:
a camera having a field of view, the camera configured to acquire imaging information within the field of view;
a trained neural network model, wherein the trained neural network model is configured to compare identified objects or aspects within the acquired imaging information with expected results for one or more views corresponding to known locations and orientations associated with a vehicle; and
at least one processor coupled to the camera and configured to acquire, at a time of an installation process, the imaging information from the camera, wherein the installation process is a process of installing the camera onto the vehicle to position the camera in an installation location on the vehicle, wherein the at least one processor is configured to:
autonomously set, at the time of the installation process, vehicle configuration parameters using the trained neural network model based on the imaging information within the field of view;
determine that the field of view of the camera is not in compliance with a target specification during the installation process;
provide instructions to an operator to adjust the camera into compliance with the target specification in response to the processor determining that the field of view of the camera is not in compliance with the target specification during the installation process;
analyze a resulting field of view of the camera from the newly adjusted camera by using the trained neural network model after the operator follows the provided instructions during the installation process; and provide additional instructions to the operator, during the installation process, to further adjust the camera until the field of view of the camera is in compliance with the target specification if the resulting field of view is not in compliance with the target specification.

2. The system of claim 1, wherein the vehicle configuration parameters autonomously set by the at least one processor include a predefined camera location.

3. The system of claim 1, wherein the vehicle configuration parameters autonomously set by the at least one processor include at least one of a frame rate setting, resolution setting, quality setting, or compression setting.

4. The system of claim 1, wherein the at least one processor is configured to determine whether an actual field of view of the camera is in compliance with a target field of view of the camera at the time of installation of the camera on the vehicle by comparing the imaging information acquired with the camera to predetermined target criteria.

5. The system of claim 4, wherein the at least one processor is configured to perform a responsive act responsive to determining that the actual field of view of the camera is not in compliance with the target field of view.

6. The system of claim 5, wherein performing the responsive act includes providing instructions to an operator to bring the actual field of view of the camera into compliance with the target field of view.

7. The system of claim 6, wherein the instructions include an instruction to the operator to adjust an orientation of the camera.

8. The system of claim 1, wherein the at least one processor is configured to be disposed on an event recorder of the vehicle with which the camera is configured to be used.

9. A method comprising:
positioning a camera having a field of view in an installation location during an initial installation process that includes installing the camera onto a vehicle to position the camera in an installation location on the vehicle, the camera configured to acquire imaging information within the field of view;
comparing, by way of a trained neural network model, objects or aspects identified within the acquired imaging information with expected results for one or more views corresponding to known locations and orientations associated with the vehicle;
acquiring, with at least one processor operably coupled to the camera, the imaging information from the camera during the installation process; and
autonomously setting, with the at least one processor, vehicle configuration parameters using a trained neural network model based on the imaging information within the field of view during the installation process;
determining, with the at least one processor, that the field of view of the camera is not in compliance with a target specification during the installation process;
providing, with the at least one processor, instructions to an operator to adjust the camera into compliance with the target specification;
analyzing, with the at least one processor, a resulting field of view from the adjusted camera by using the trained neural network model after the operator follows the instructions; and
providing, with the at least one processor, additional instructions to the operator to adjust the camera until the field of view of the camera is in compliance with the target specification based on the resulting field of view being out of compliance with the target specification.

10. The method of claim 9, wherein autonomously setting the vehicle configuration parameters includes autonomously setting a predefined camera location.

11. The method of claim 9, wherein autonomously setting the vehicle configuration parameters includes autonomously setting at least one of a frame rate setting, resolution setting, quality setting, or compression setting.

12. The method of claim 9, wherein the at least one processor is configured to determine an actual field of view of the camera from the imaging information, wherein the method further comprises autonomously determining, with the at least one processor, whether the actual field of view of the camera is in compliance with a target field of view by comparing the imaging information acquired with the camera to predetermined target criteria.

13. The method of claim 12, further comprising performing a responsive act responsive to determining that the actual field of view of the camera is not in compliance with the target field of view.

14. The method of claim 13, wherein performing the responsive act includes providing instructions to an operator to adjust an orientation of the camera to bring the actual field of view of the camera into compliance with the target field of view based upon determining that the actual field of view of the camera is not in compliance with the target field of view.

15. A system comprising:
a vehicle;
a camera disposed on the vehicle, the camera having a field of view, the camera configured to acquire imaging information within the field of view;
a trained neural network model, wherein the trained neural network model is configured to compare identified objects or aspects within the acquired imaging information with expected results for one or more views corresponding to known locations and orientations associated with a vehicle; and
at least one processor coupled to the camera and configured to acquire, during an installation process of the camera on the vehicle, the imaging information from the camera, wherein the installation process is a process of installing the camera onto the vehicle to position the camera in an installation location on the vehicle, wherein the at least one processor is configured to:
autonomously set, during the installation process, vehicle configuration parameters using the trained neural network model based on the imaging information within the field of view;
determine whether an actual field of view of the camera is in compliance with a target field of view by comparing the imaging information acquired by the camera to predetermined target criteria,
provide instructions to an operator to adjust the orientation of the camera to bring the actual field of view of the camera into compliance with the target field of view based upon determining that the actual field of view of the camera is not in compliance with the target field of view during the installation process;
analyze a resulting field of view of the camera from the newly adjusted camera by using the trained neural network model after the operator follows the provided instructions during the installation process; and
provide additional instructions to the operator, during the installation process, to further adjust the camera until the field of view of the camera is in compliance with the target field of view if the resulting field of view is not in compliance with the target field of view.

16. The system of claim 15, wherein the vehicle configuration parameters autonomously set by the at least one processor include a predefined camera location.

17. The system of claim 15, wherein the vehicle configuration parameters autonomously set by the at least one processor include at least one of a frame rate setting, resolution setting, quality setting, or compression setting.

18. The system of claim 15, wherein the vehicle comprises an event recorder, and wherein the at least one processor is disposed on the event recorder.

19. The system of claim 15, wherein the at least one processor is configure to acquire the imaging information from the camera during an initial installation of the camera on the vehicle.

20. The system of claim 15, wherein the at least one processor determining whether the actual field of view of the camera is in compliance with the target field of view comprises the least one processor determining how much, and in what direction, the actual field of view is offset or misaligned from the target field of view.

\* \* \* \* \*